Inventor
James N. Brophy
by Roberts, Cushman & Grover
Attys

Nov. 15, 1960 J. N. BROPHY 2,959,809
FISHING DRESSING APPARATUS
Filed July 25, 1958 2 Sheets-Sheet 2

Inventor
James N. Brophy
by Roberts, Cushman & Grover
Attys

United States Patent Office 2,959,809
Patented Nov. 15, 1960

2,959,809

FISH DRESSING APPARATUS

James N. Brophy, 180 Prospect St., Wakefield, Mass.

Filed July 25, 1958, Ser. No. 750,970

1 Claim. (Cl. 17—3)

This invention relates to fish dressing apparatus and more particularly to apparatus for successively decapitating and gutting fish.

It is the principal object of this invention to provide improved apparatus for mechanically dressing fish. A further object is to provide fish dressing apparatus for successively decapitating and gutting a fish along a path without removing the fish from or shifting it in said path. A still further object is to provide apparatus which will decapitate fish at a predetermined angle less than 90° with respect to the backbone and to thereafter slit the belly whereby the entrails can be easily removed.

According to this invention, these objects are achieved in fish dressing apparatus which comprises a conveyor moving along a path, a carrier on said conveyor adapted to support and more fish sidewise along the path, cutting means acting lengthwise of said path for decapitating the fish, and gutting means moving transversely of the path for opening the belly of the fish, whereby the fish is decapitated and gutted at successive positions of said carrier along said path. Preferably, the carrier has a wall extending across the path which has an inwardly extending slot through which the gutting means operates. While it is preferred that this wall be a bottom wall, it can be an upstanding side wall.

In a further, more particular, aspect this invention comprises fish dressing apparatus having a conveyor moving along a path, a carrier on said conveyor having a bottom wall and opposed upstanding walls adapted to support a fish in upright position and to move it sidewise along the path with its head at one end of the carrier, said bottom wall having a slot extending inwardly from said end, one of said upstanding walls having an extension at said end beyond the end of the other wall forming a support for the head of the fish, said extension having an upstanding slot open at the top, cutting means acting through the upstanding slot to decapitate the fish, and gutting means moving transversely of the path through said inwardly extending slot for opening the belly of the fish. Preferably the upstanding slot is inclined away from the backbone of the fish at an angle less than 90° whereby the fish heads are severed at an angle particularly advantageous for cleaning.

In a still further aspect, this invention comprises a fish carrier for use in fish dressing apparatus, said carrier comprising a bottom wall and opposed upstanding walls adapted to support and move a fish wherein one of said walls has an open, inwardly directed slot adapted to receive gutting means to open the belly of the fish. Preferably the inwardly-directed slot is in the bottom wall, one of the upstanding walls has an extension to support the head of the fish and the extension has a slot open at the top to receive means for decapitating fish. Preferably the upstanding slot is inclined away from the backbone of the fish at an angle less than 90°.

This invention may better be understood by reference to the accompanying drawings wherein Fig. 1 is a plan view of improved fish dressing apparatus according to this invention;

Figure 1:
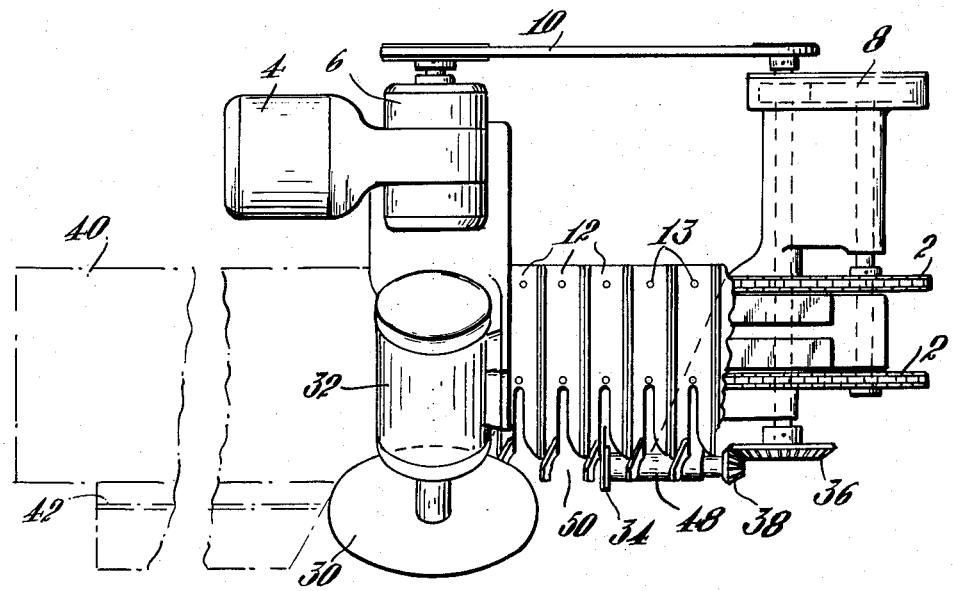
Figure 2:
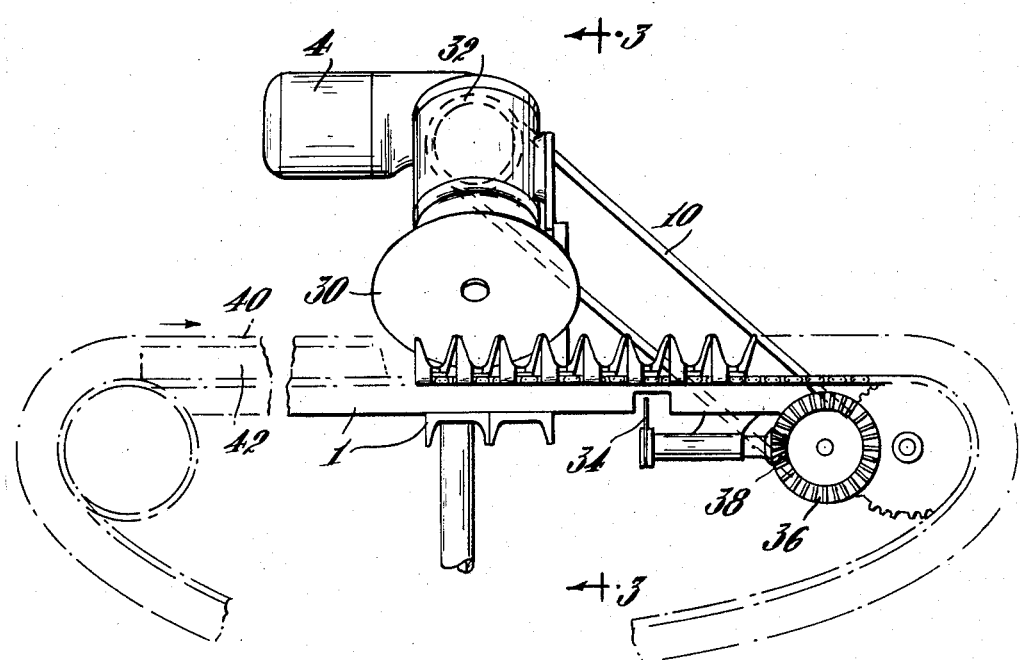
Fig. 2 is a front view thereof.
Figure 3:
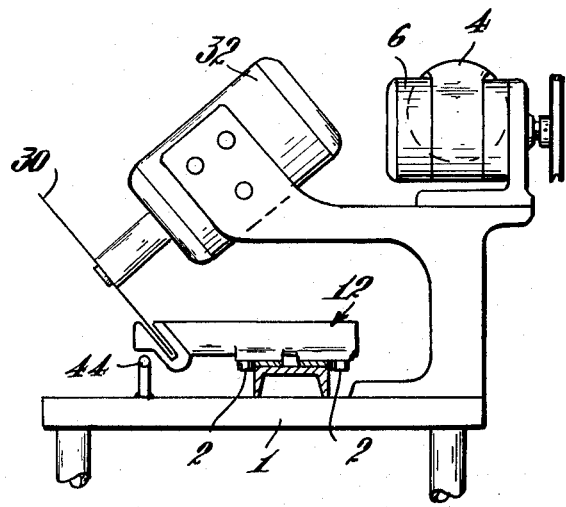
Fig. 3 is a section taken on the line 3—3 of Fig. 2.

Referring to the drawings, the embodiment of this invention illustrated comprises a frame 1 carrying an endless chain conveyor 2 which is driven by the motor 4 through gears 6 and 8 and the belt 10.

Figure 5:
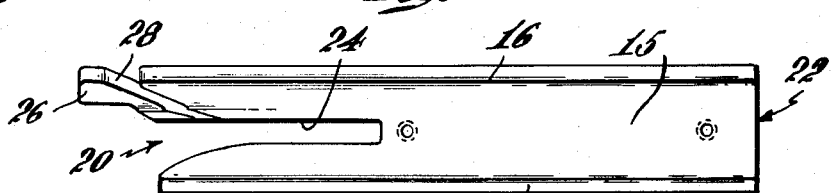
Fig. 5 is a plan view of a fish carrier.
Figure 6:
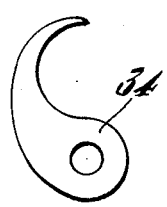
Fig. 6 is a side view of a knife used to slit the belly of a fish after decapitation.

A series of spaced transverse trough-shaped fish carriers 12 are secured to the chain conveyor 2 by means of bolts or screws 13 extending through bosses 14 and links in the conveyor chain. As best illustrated in Fig. 5, each of these fish carriers is open at the ends 20 and 22 and comprises a bottom wall 15 and opposed upstanding walls 16 and 18. The bottom wall 15 is provided between the walls 16 and 18 with a horizontal, inwardly-extending slot 24 open at the end 20. The wall 16 is provided with an extension 26 having an upstanding slot 28 open at the top.

Rotary knife means 30, driven by the motor 32, is mounted over the conveyor 2 and the carriers 12 and is disposed to operate through the slot 28 in the carriers 12.

A butting knife means 34, driven by the motor 4 through gears 36 and 38 which are synchronized with the carrier 2, is disposed adjacent the open ends 20 and is adapted to operate through the horizontal slot 24 in the carriers. This knife is geared to make one downward pass per carrier in the direction indicated by the arrow in Fig. 4 through the slot 24 of each carrier 12.

In the operation of the machine, fish are fed to a remote loading station 40 where they are placed one fish per carrier in an upright position. The fish are laterally located by placing the nose against a guide edge 42. The fish are then conveyed to the knife 30 which operates through the carrier slots 28 to sever the heads. During the operation of the knife 30, the fish head is laterally supported by the extension 26 and vertically supported by a rod support 44 attached to the frame 1 directly under the knife 30.

After the fish heads are severed by the knife 30, the fish are conveyed to the gutting knife 34 which operates through an arc 46 in a plane perpendicular to the plane of the knife 30, entering the exposed end of the decapitated fish and passing through the carrier slot 24 to slit the belly of the fish to provide for easy removal of the fish entrails.

The operation of the hook-shaped gutting knife 34 slits the belly of the fish and may or may not remove some of the entrails at the same time. However, further cleaning operations are readily performed on the decapitated and slit fish and the term "gutting" as used herein is intended to include slitting the belly of the fish plus entrail removal, if any, which occurs therewith. The fish are thereafter delivered from the end of the conveyor to conventional cleaning and packing apparatus.

Figure 4:
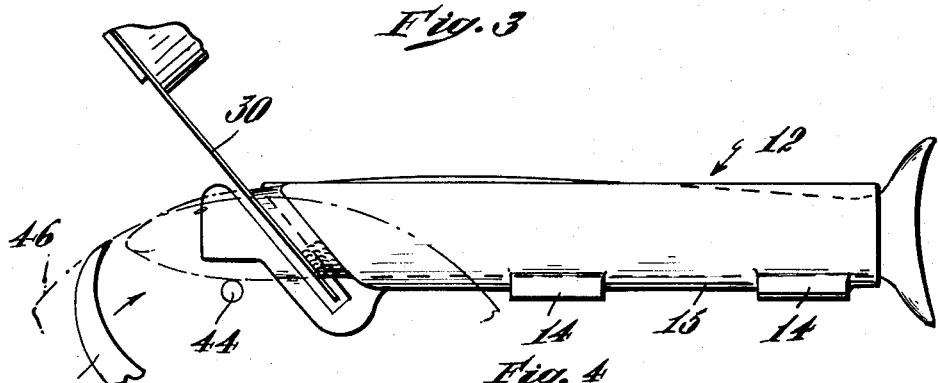
Fig. 4 is a diagrammatical side view on an enlarged scale illustrating the operation of the cutting means according to this invention.

It is preferred that the knife 30 and the carrier slots 28 be arranged at an angle as shown in Fig. 4 wherein the meaty backbone portion of the fish is preserved while the pectoral bones in the lower part of the fish are removed for more convenient and efficient cleaning and to prevent their interference with the gutting knife 34. When so arranged, the upstanding slot 28 in the fish carrier 12 is inclined away from the backbone of the fish at an angle less than 90°. This arrangement has been found particularly desirable and efficient in the dressing of fish that are packed whole.

I claim:

Fish dressing apparatus comprising a conveyor moving along a path, a carrier on said conveyor having a bottom wall extending across the path and adapted to support and move the fish sidewise along the path with its head at one end of said bottom wall, said wall having a slot extending inwardly from said end, cutting means acting lengthwise of said path at one end of the carrier for decapitating the fish, and a rotating knife having a hook-shaped end movable transversely of the path in and out of the path and through said one end of the carrier downwardly through said slot and toward said bottom wall for opening the belly of the fish, whereby the fish is decapitated and gutted at successive positions of said carrier along said path without removing the fish from or shifting it in the carrier.

References Cited in the file of this patent

UNITED STATES PATENTS

| | | |
|---|---|---|
| 249,663 | Palson | Nov. 15, 1881 |
| 645,862 | Letson et al. | Mar. 20, 1900 |
| 1,728,254 | Rieske | Sept. 17, 1929 |
| 1,799,948 | Bergen | Apr. 7, 1931 |

FOREIGN PATENTS

| | | |
|---|---|---|
| 157,161 | Germany | Dec. 9, 1904 |
| 67,838 | Norway | Oct. 25, 1948 |
| 1,153,418 | France | Oct. 7, 1957 |